United States Patent
Tachikawa

[19]
[11] Patent Number: 6,160,371
[45] Date of Patent: Dec. 12, 2000

[54] ROBOT SYSTEM, CONTROL METHOD, AND RECORDING MEDIUM

[75] Inventor: Jin Tachikawa, Hino, Japan

[73] Assignee: Canon Kabushiki Kaisha, Tokyo, Japan

[21] Appl. No.: 09/243,177

[22] Filed: Feb. 2, 1999

[30] Foreign Application Priority Data

Feb. 17, 1998 [JP] Japan .................................. 10-035074

[51] Int. Cl.[7] .......................... G05G 11/00; G01S 13/02
[52] U.S. Cl. ......................... 318/568.11; 901/6; 901/46; 901/50
[58] Field of Search ..................... 318/568.11; 74/490.01; 901/2, 6, 8, 46, 50

[56] References Cited

U.S. PATENT DOCUMENTS

| | | | |
|---|---|---|---|
| 5,289,273 | 2/1994 | Lang | 348/121 |
| 5,372,340 | 12/1994 | Ihara et al. | 244/161 |
| 5,461,292 | 10/1995 | Zondlo | 318/587 |
| 5,528,955 | 6/1996 | Hannaford et al. | 74/490.01 |

*Primary Examiner*—Bentsu Ro
*Attorney, Agent, or Firm*—Morgan & Finnegan LLP

[57] ABSTRACT

When the operator inputs a macro control command, each microrobot takes an actual action on the basis of the command. That action is autonomously controlled to successfully execute the macro command. The autonomous control is to feed back and control the deviation between sensor information (position, speed, and acceleration) of the microrobot and the control command. When a plurality of microrobots are used and must take distributed, cooperative actions, conditions required for task completion such as environmental conditions (temperature, humidity, and the like) are obtained via communications with the base controller and are used for control information compensation. Such control allows each microrobot to cope with complicated tasks independently of the number of sensors, communication performance, and computer processing performance.

24 Claims, 11 Drawing Sheets

PRIOR ART

PRIOR ART

ROBOT SYSTEM, CONTROL METHOD, AND RECORDING MEDIUM

BACKGROUND OF THE INVENTION

The present invention relates to a robot system and control method for remote-controlling a robot or controlling a plurality of robots, and a recording medium.

The technology/product field called micromachines has rapidly broadened and advanced along with the advanced micropatterning technique that can form a mechatronics structure on a silicon chip, and miniaturization of peripheral parts. Especially, transportation structures on the $\mu$m order have been extensively studied and developed, pushed by the needs for a new medical technique.

Based on changes in social environment represented by growing population of the aged, lower birthrate, a rise of nuclear families, decline of agricultural population, non-popularity of science, and the like, robotization is accelerating its progress not only in the industrial field but also in home use in advanced countries.

Furthermore, owing to population explosion, desertification, agricultural product shortages, energy supply systems, global environmental issues, political instability, and the like, reorganization of unskilled labor propelled by social problems in developing countries has been demanded.

Along with such changes in social structure, one field that has gained widespread appeal is a microrobot having a size around several cm to 100 $\mu$m and manufactured by machining/assembly processes. Such microrobot is a relatively large one among micromachines. The microrobot has no clear definition yet, but for those skilled in the art, the microrobot is reckoned to be a robot having a size around several cm, which is manufactured by a mechatronics technique and has a certain level of intelligence, task function, and self-running function, as described in, e.g., Japanese Patent Laid-Open No. 7-168622.

However, those skilled in the art also agree that the size of a similar robot is going to diminish to about several $\mu$m and the robot is going to be combined with a biological function due to improvement in machining technique and the like and advance of biological industries. As another technical trend of microrobots, group control is proposed. Microrobots are inferior to human beings and normal industrial robots in most performance fields such as intelligence, transportation capability, speed, task precision, and the like. Merits of microrobots include a scale merit arising from their small size, and lightweight, high safety, low cost, and the like per unit length and unit area on the basis of the small size. To compensate for the demerits and to utilize the merits, attempts to use a group of a large number of microrobots to do a cooperative task, and do tasks such as transportation of heavy articles, display operation, cleaning, and the like have been made.

FIG. 4 shows one example of an existing microrobot control method. In this example, a microrobot detects illuminance differences from the amount of incoming light using a sensor, and travels on a predetermined course.

Referring to FIG. 4, reference numeral 41 denotes a sensor for detecting the light intensity; 42, a microrobot main body; 43, a light source; and 44, a beam spot formed by the light source 43 in FIG. 4.

In this way, a conventional self-running microrobot is controlled by limited processing capability of the microrobot main body and assist means pre-set by an operator.

Hence, it is very hard for such conventional microrobot control method to perform complicated tasks or many, routine tasks.

In particular, the present inventors have developed a microrobot main body to do complicated, difficult tasks (e.g., those listed in (1) to (11) below). However, it is impossible to apply the conventional simple control method to the microrobot, thus interfering with further development.

The conventional control method forms a closed loop in which the operator's instruction (target variable) has a one-to-one correspondence with the state feedback variable. In such control method, for example, when a robot is controlled to do a task at a remote place or in an external environment, the operator's space is physically different from the task space of the microrobot. In such case, it becomes hard to collect information (weather information, local temperature information, and the like) that the operator cannot give and to reflect such information in the control rule.

However, such processing cannot often be done due to the limited processing performance and communication performance of a controller (computer) since a plurality of external conditions must be input to adapt the control rule. Furthermore, in order to independently control a plurality of microrobots, the required computation volume and communication volume increase considerably.

Examples of the complicated, difficult tasks are:

(1) farming tasks such as vermin extermination, weeding, cropdusting, fertilizer sprinkling, watering, sunshine control, measures against bird damage, cultivation, temperature control, reaping, recognition of blight and noxious insects, and the like;

(2) space tasks such as remote sensing, lunar/planetary surface probing, repair of satellite, space dust cleaning, and the like;

(3) energy applications such as solar energy collection, oceanic uranium recovery, solar cell cleaning, nuclear power plant cleaning, and the like;

(4) investigation tasks such as underground resource probing, structure durability inspection, human tracing, oceanic monitor, invasion monitor, police criminal investigation, and the like;

(5) home cleaning such as toilet/bath cleaning, pipe cleaning, vermin control, window cleaning, and the like;

(6) processes for environment protection such as a garbage process, parts recycle process, dangerous article disposal, nitrogen fixing, and the like;

(7) construction/building assistance such as dangerous article inspection, partial painting, small parts transportation, measure against leak in the roof, illumination function, key function, and the like;

(8) factory/distribution assistance such as simplified parts assembly, distribution control, cooperative transportation, and the like;

(9) medical service tasks such as scatoscopy/urinalysis, human waste disposal for sick persons, and the like;

(10) hobby applications such as weekend gardening, pet control, artificial fishing bait, machining assistance, musical instrument performance, automobile cleaning, painting education, and the like; and

(11) safeguard tasks such as lifesaving, patrol task, baggage guard, and the like.

SUMMARY OF THE INVENTION

It is an object of the present invention to provide a microrobot system which can acquire many kinds of information in addition to an operator's instruction, and autonomously determine appropriate actions for successful completion of an objective instruction on the basis of the instruction and information, and its control method. In order to achieve the above object, a robot system and its control method, and a recording medium, according to the present invention comprise the following arrangements.

More specifically, a robot system for controlling a robot on the basis of an instruction from an operator, comprises first reception means for receiving the instruction from the operator, second reception means for receiving external information, third reception means for receiving a state quantity of the robot, base controller for generating an action schedule command for the robot using data received by the first reception means as a target value and data received by the second and third reception means as first state feedback variables, robot controller for generating a drive command for driving the robot on the basis of the action schedule command generated by the base controller, sensing means for sensing the state quantity of the robot, and determination means for determining a coverage of the action schedule command by comparing the state quantity sensed by the sensing means and the drive command value directed by the robot controller, and command values of the first and robot controller are distributed and controlled in accordance with a determination result of the determination means.

A method of controlling a robot system for controlling a robot on the basis of an instruction from an operator, comprises the first reception step of receiving the instruction from the operator, the second reception step of receiving external information, the third reception step of receiving a state quantity of the robot, the first control step of generating an action schedule command for the robot using data received by in the first reception step as a target value and data received in the second and third reception steps as first state feedback variables, the second control step of generating a drive command for driving the robot on the basis of the action schedule command generated in the first control step, the sensing step of sensing the state quantity of the robot, and the determination step of determining a coverage of the action schedule command by comparing the state quantity sensed in the sensing step and the drive command value directed in the second control step, and command values of the first and second control steps are distributed and controlled in accordance with a determination result in the determination step.

A computer-readable recording medium comprises a program that makes a computer implement: first reception means for receiving the instruction from the operator; second reception means for receiving external information; third reception means for receiving a state quantity of the robot; base controller for generating an action schedule command for the robot using data received by the first reception means as a target value and data received by the second and third reception means as first state feedback variables; robot controller for generating a drive command for driving the robot on the basis of the action schedule command generated by the base controller; sensing means for sensing the state quantity of the robot; and determination means for determining a coverage of the action schedule command by comparing the state quantity sensed by the sensing means and the drive command value directed by the robot controller, and the program makes the computer distribute and control command values of the first and robot controller in accordance with a determination result of the determination means.

A robot system for controlling a robot on the basis of an instruction from an operator, comprises base controller for generating a control command on the basis of the instruction from the operator, external environment information, and a state quantity of the robot, and robot controller for controlling the robot by autonomously deciding situation on the basis of the control command generated by the base controller and information from a sensor of the robot.

A method of controlling a robot system for controlling a robot on the basis of an instruction from an operator, comprises the first control step of generating a control command on the basis of the instruction from the operator, external environment information, and a state quantity of the robot, and the second control step of controlling the robot by autonomously deciding situation on the basis of the control command generated in the first control step and information from a sensor of the robot.

According to one preferred aspect of the present invention, in the robot system of claim 1, the base controller can independently control a plurality of robots.

According to one preferred aspect of the present invention, in the robot system of claim 1, the robot controller controls to drive the robot using the action schedule command generated by the base controller as a target value, and the state quantity sensed by the sensing means as a second state feedback variable.

According to one preferred aspect of the present invention, in the robot system of claim 1, the second reception means can receive information transmitted by satellite broadcast, a satellite communication, a weather satellite, or a GPS satellite.

According to one preferred aspect of the present invention, in the robot system of claim 1, the second reception means can receive information via a telephone line, radio line, or network line.

According to one preferred aspect of the present invention, in the robot system of claim 1, the second reception means can receive information from a position measurement system.

According to one preferred aspect of the present invention, in the robot system of claim 1, the second reception means can receive weather information from weather observation means placed in the vicinity of an activity range of the robot.

According to one preferred aspect of the present invention, in the robot system of claim 1, the second reception means can receive monitor information from image processing means placed in the vicinity of an activity range of the robot.

According to one preferred aspect of the present invention, in the robot control method of claim 9, the first control step can independently control a plurality of robots.

According to one preferred aspect of the present invention, in the robot control method of claim 9, the second control step controls to drive the robot using the action schedule command generated in the first control step as a target value, and the state quantity sensed in the sensing step as a second state feedback variable.

According to one preferred aspect of the present invention, in the robot control method of claim 9, the second reception step can receive information transmitted by satellite broadcast, a satellite communication, a weather satellite, or a GPS satellite.

According to one preferred aspect of the present invention, in the robot control method of claim 9, the second reception step can receive information via a telephone line, radio line, or network line.

According to one preferred aspect of the present invention, in the robot control method of claim 9, the second reception step can receive information from a position measurement system.

According to one preferred aspect of the present invention, in the robot control method of claim 9, the second reception step can receive weather information from weather observation means placed in the vicinity of an activity range of the robot.

According to one preferred aspect of the present invention, in the robot control method of claim 9, the second reception step can receive monitor information from image processing means placed in the vicinity of an activity range of the robot.

According to one preferred aspect of the present invention, in the robot system of claim 1, the base controller comprises first receiving means for receiving the instruction from the operator, second receiving means for receiving external information, third receiving means for receiving a state quantity of the robot, first control algorithm generation means for generating a command for the robot using data received by the first receiving means as a target value, and data received by the second and third receiving means as first state feedback variables, first basic operation means for controlling execution of basic operation on the basis of the generated command, first mission operation means for controlling mission operation of the instruction from the operator, dynamics control means for servo-controlling the basic and mission operations of the robot, and first task management means for managing mission of the instruction from the operator.

According to one preferred aspect of the present invention, in the robot system of claim 18, the base controller further comprises first kinematic coordinate conversion means capable of calculating position information of the robot on the basis of geometric coordinate conversion.

According to one preferred aspect of the present invention, in the robot system of claim 18, the base controller further comprises first locus calculation means for calculating a specific locus when the robot executes the instruction mission operation along the specific locus.

According to one preferred aspect of the present invention, in the robot system of claim 18, the base controller comprises cooperative control means for, when a plurality of robots are to be controlled, cooperatively controlling the robots.

According to one preferred aspect of the present invention, in the robot system of claim 1, the robot controller comprises interface means for exchanging data with the base controller, second task management means for managing mission of an instruction from the base controller, second control algorithm generation means for generating control data for mission of the instruction on the basis of information from the task management means, second basic operation means for performing basic operation on the basis of the generated control data, second mission operation means for executing the instruction mission operation, and servo control means for servo-controlling the basic and mission operations.

According to one preferred aspect of the present invention, in the robot system of claim 22, the robot controller further comprises second kinematic coordinate conversion means capable of calculating position information of itself on the basis of geometric coordinate conversion.

According to one preferred aspect of the present invention, in the robot system of claim 22, the robot controller further comprises second locus calculation means for calculating a specific locus when the instruction mission operation is executed along the specific locus.

According to one preferred aspect of the present invention, the robot system further comprises interface means for exchanging the control command or the state quantity of the robot, and even when the first and robot controller are placed in distant spaces, the robot can be controlled by exchanging the command or the state quantity of the robot via the interface means.

According to one preferred aspect of the present invention, the robot control further comprises the interface step of exchanging the control command or the state quantity of the robot, and the interface step can exchange the command or the state quantity of the robot even when the robot is placed in a distant space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE INVENTION

Preferred embodiments of the present invention will be described in detail in accordance with the accompanying drawings.

Figure 3:
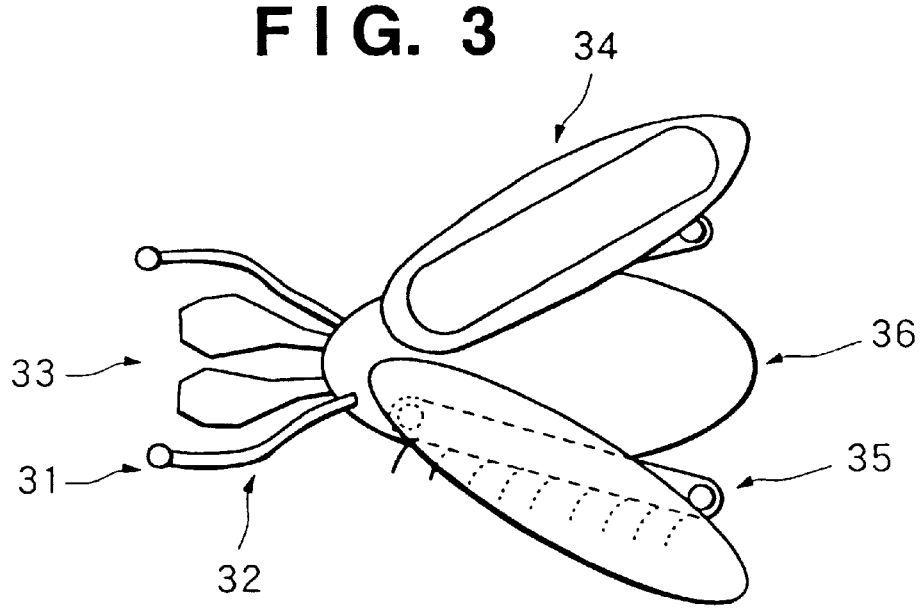
FIG. 3 is a view showing a microrobot as an object to be controlled.
Figure 4:
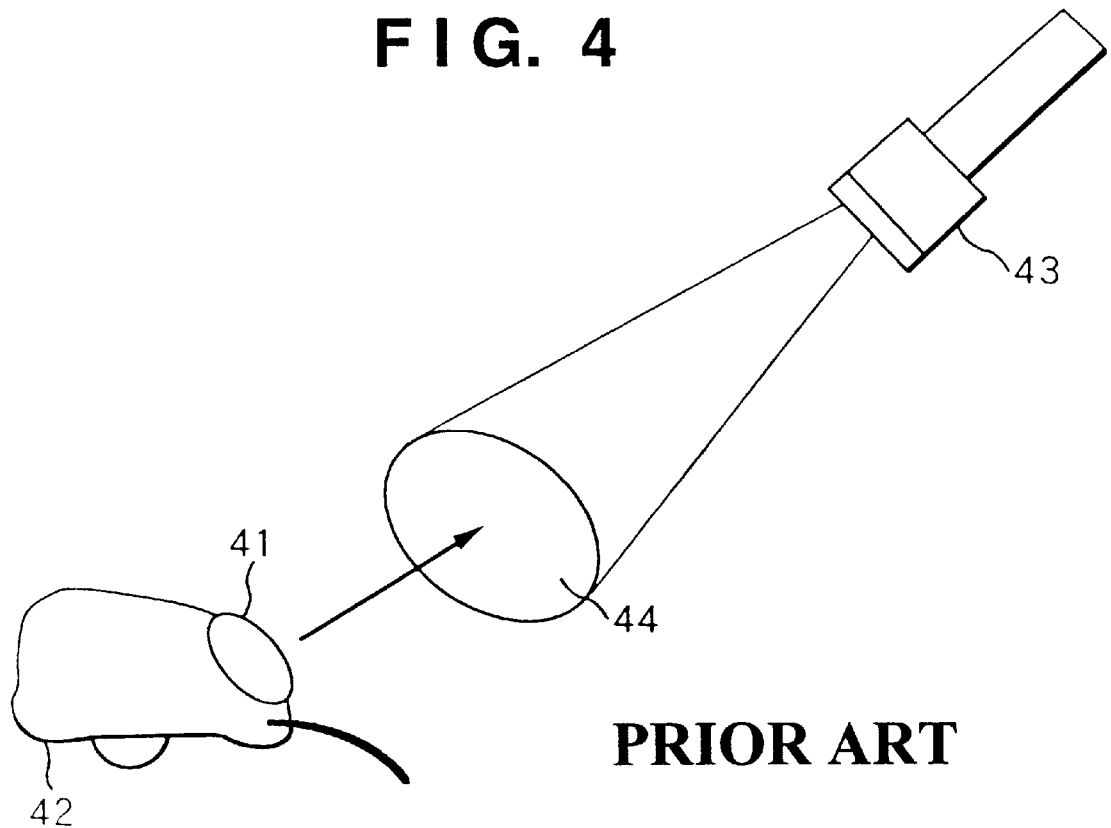
FIG. 4 is a view showing a control example of a conventional microrobot.

Prior to the description of an embodiment, a standalone microrobot as the object to be controlled by the system of the present invention will be explained. FIG. 3 shows an example of a microrobot, which is used in a paddy field task, but an application of this proposal is not limited to an agricultural task. Also, an embodiment will be explained using the microrobot as a motif, but the present invention is not limited to the microrobot.

Referring to FIG. 3, reference numeral 31 denotes acoustic position sensors as a sensor function; 32, antennas that control a communication function; 33, agricultural function portions; 34, solar batteries as an energy source; 35, outer-ring belts as a drive mechanism; and 36, a main body that includes a processing function.

This microrobot moves to a setup position using the acoustic position sensors 31 on the basis of activity instruction information (action schedule) received by the antennas 32, and performs actual agricultural tasks such as water purification, fertilizer sprinkling, and the like. Such microrobot has limited task capability, stability, and the like when it is used alone. For this reason, a plurality of such microrobots are often used together in tasks.

Figure 1:
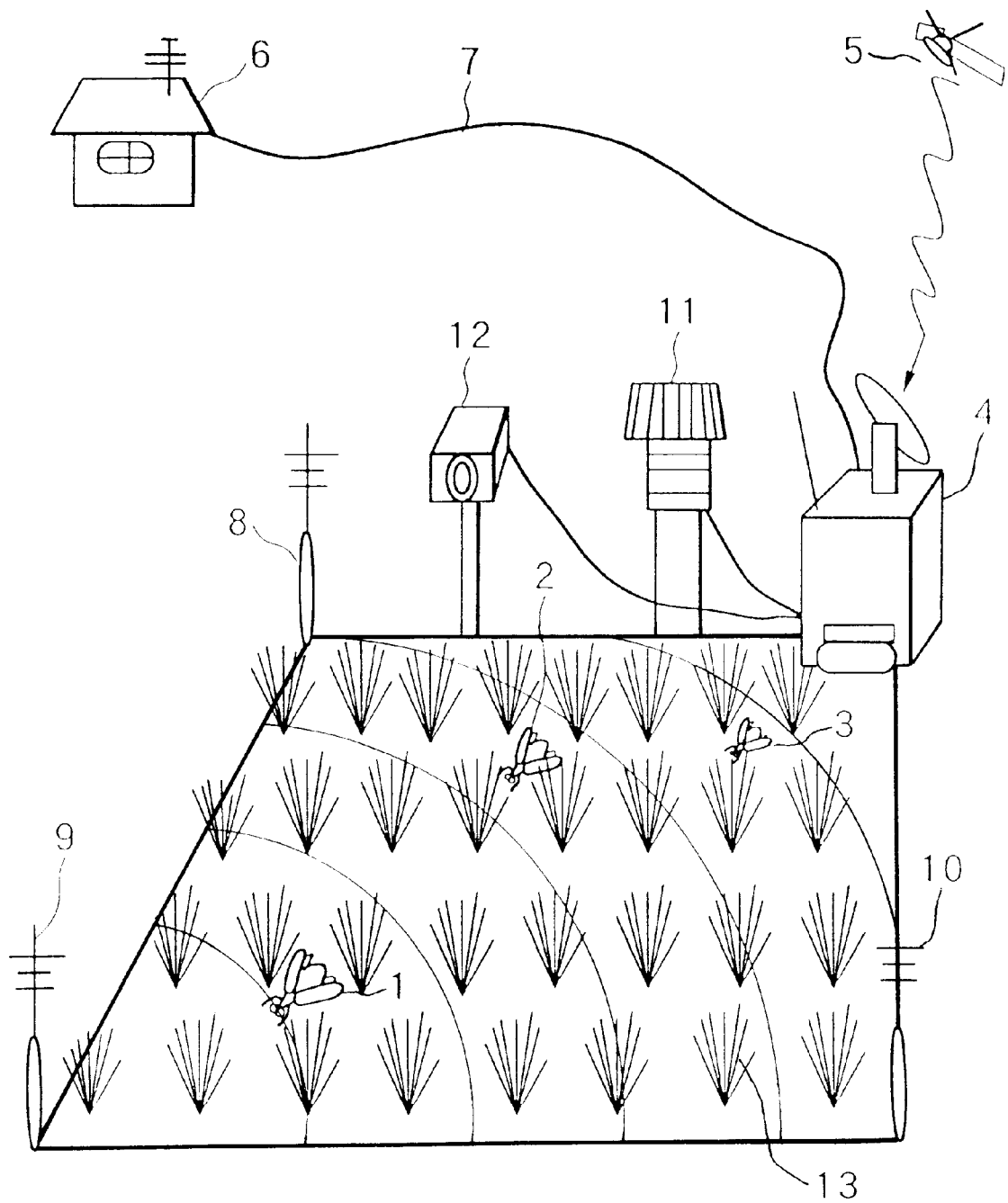
FIG. 1 is a view for explaining the first embodiment according to the present invention.

An action schedule as information from a local base 4 is received by the antennas 32, and the state quantity of the microrobot is transmitted to the local base 4 (FIG. 1).

Control of Microrobot

FIG. 1 best illustrates an embodiment according to the present invention. Referring to FIG. 1, reference numerals 1 to 3 denote microrobots to be controlled; 4, a local base for directly controlling the microrobots; 5, a communication satellite as one of information sources; 6, an operator's location which is distant from the work space of the microrobots; 7, a wired or wireless communication line; 8, 9, and 10, local position measuring devices; 11, an automatic instrument shelter as an weather observation device; 12, an image processing device for monitoring the entire paddy field to measure the coordinate position of each paddy; and 13, a paddy field as a work field. In the standby state, the microrobots 1 to 3 are housed in the local base 4. As a result of processing of information from the individual information sources, if the local base 4 decides necessity of tasks, the microrobots 1 to 3 are deployed on the paddy field 13 outside the local base 4 to make predetermined tasks. Processing of information will be explained below.

Figure 5A:
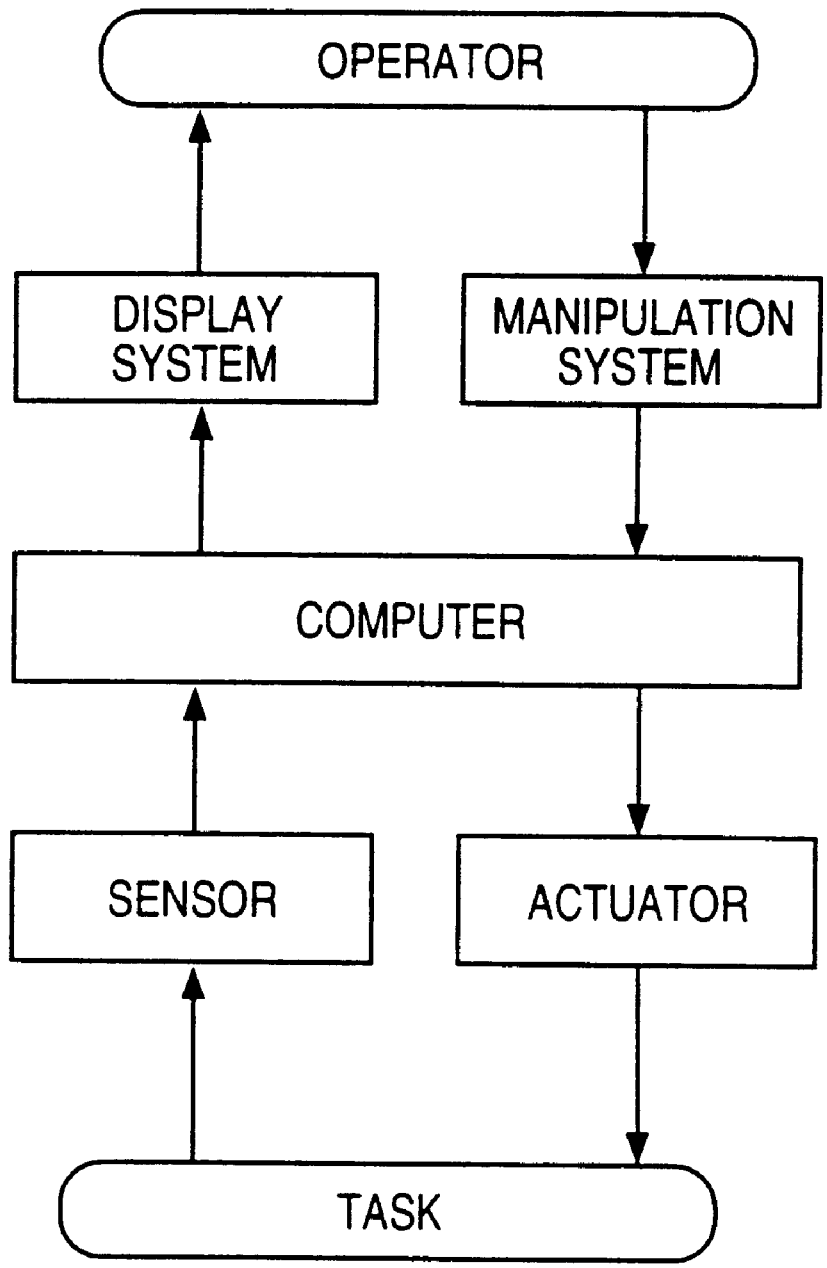
FIG. 5A is a block diagram showing the arrangement of conventional master-slave control.

In conventional task control for a robot, as shown in FIG. 5A, information fed back from a sensor has a one-to-one correspondence with the operator's instruction. For this reason, the operator must always monitor the state of the sensor, and must intervene in control needed to successfully complete the task via a manipulation system as needed.

Figure 5B:
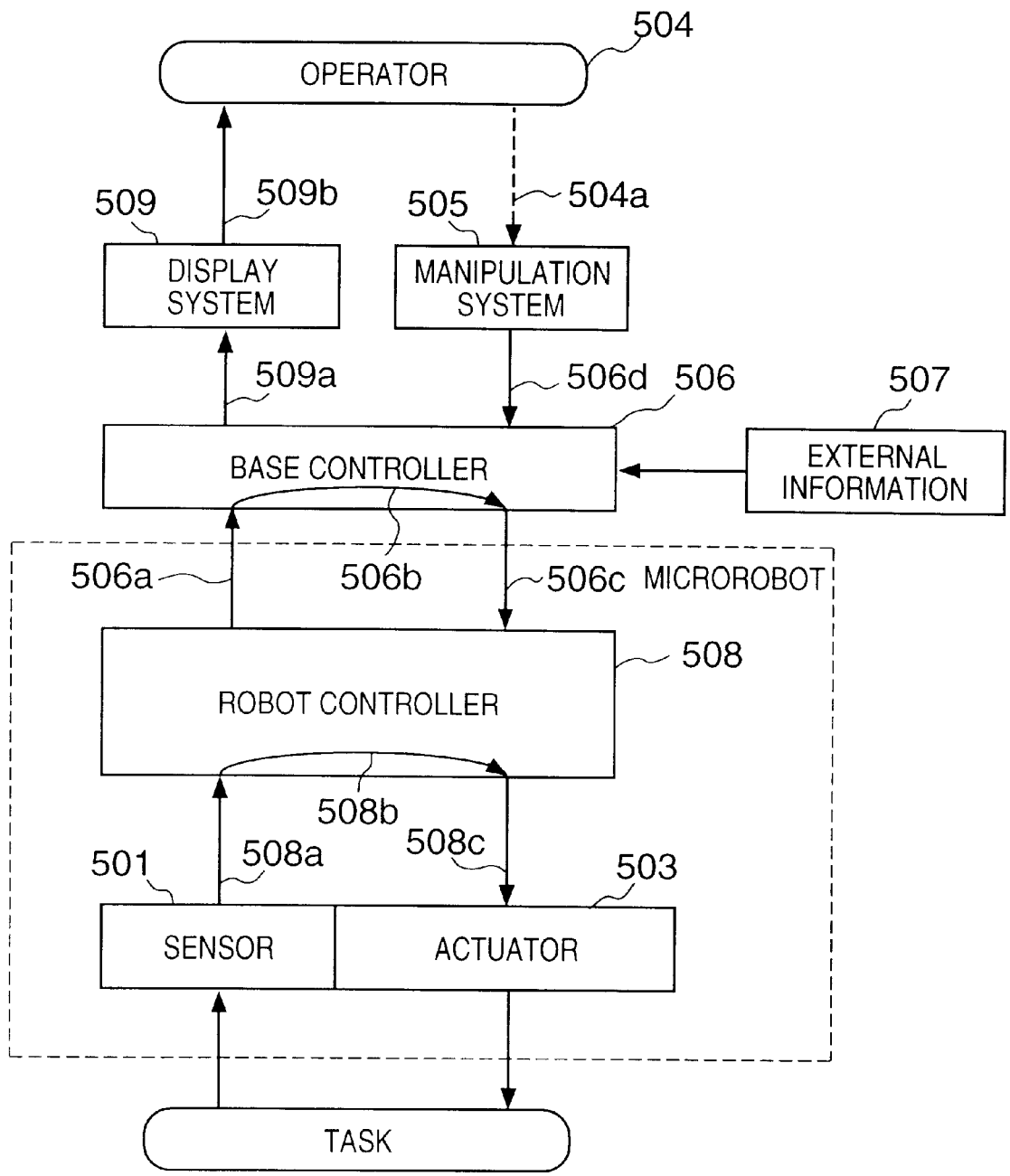
FIG. 5B is a block diagram showing the control arrangement of a microrobot corresponding to an embodiment of the present application.

FIG. 5B is a control block diagram associated with a robot system and its control method according to the present application, which diagram clarifies the difference from the conventional robot control method.

In microrobot control according to the present application (FIG. 5B), the operator joins in tasks in only minimum required situations. More specifically, a robot controller 508 calculates a controlled variable (508b) on the basis of information (508a) fed back from a sensor 501, and outputs a command variable (508c) to an actuator 503. The sensor feeds back state quantities such as position information, speed information, and the like corresponding to target values (a mission assigned to the microrobot; to be referred to as a "task" hereinafter) input by an operator 504 via a manipulation system 505. In this control loop (508a, 508b, 508c), the robot controller 508 calculates state quantities on the basis of information sensed by the sensor 501, and outputs a control command to the actuator 503 (this loop will be referred to as a "first control loop" hereinafter). The robot controller 508 controls the actuator 503 on the basis of information from the sensor 501 and the like, and autonomously controls each microrobot to finally complete the task. For example, differences between the target values, and position information in position control and speed information in speed control, are so-called deviations, and the task coverage is evaluated based on these deviations.

The robot controller 508 sends the state quantities of each microrobot to a base controller 506. The base controller 506 receives an instruction from the operator as a target value (506d), and receives other external information 507 and data (506a) from the robot controller 508 as state feedback variables. The controller 506 then generates a control command value (506b) and outputs it to the robot controller 508 (506c). This control loop (508a, 508b, 508c, 508d, 507) compensates and corrects the state quantities (506a) from the robot controller 508 on the basis of the external information 507 and the instruction from the operator (this loop will be referred to as a "second control loop" hereinafter).

The control periods (the frequencies of control) of the first and second control loops satisfy the first control loop>second control loop. The first control loop directly controls each microrobot, and the second control loop reflects information that cannot be input to adapt the control rule by only the first control loop on the control rule.

Furthermore, the base controller 506 outputs the state quantities of each microrobot to a display system 509 (509a). The operator 504 refers to the output (509b) of the display system 509, and gives a new control command (504a) to the base controller 506 via the manipulation system 505.

Hence, the operator 504 need not input instructions one by one from the manipulation system 505, and need only input minimum required instructions for control needed to successfully complete the task.

When the operator inputs a macro control command, each microrobot takes an actual action based on the command. That action is autonomously controlled to successfully execute the macro command. The base controller makes control for compensating the microrobot control for any contingency. The robot system and its control method according to the present invention are largely different from the conventional system. For example, differences between the target values, and position information in position control and speed information in speed control, are so-called deviations, and the task coverage is evaluated based on these deviations.

Referring back to FIG. 1, tasks include daily routine ones, and non-daily ones instructed by the operator 6. Tasks are classified depending on crops, but water purification normally belongs to the former tasks, and fertilizer sprinkling to the latter tasks. The routine tasks often depend on weather in case of farming. Since it is very difficult for the microrobots (1, 2, 3) themselves to decide this, a base controller (506 in FIG. 5B) in the local base 11 decides. As an information source, the operator or the manufacturer of the micromachine system gives such information to the base controller 506 as external information (507). Information can be transmitted to the local base 4 using the communication satellite 5.

Hence, information received by the microrobots (1, 2, 3) includes two different kinds of information, i.e., direct information sensed (501) by the robot main body, and external information indirectly included in a control command sent from the base controller 506.

Execution Control of Task

In the conventional control system shown in FIG. 5A, the operator receives information from a computer, and inputs macro commands to the computer. In this case, high-level control and decision are made by the operator, and the computer assists them.

By contrast, in the control in the microrobot system according to the present invention, a computer program mainly makes top-level control (base controller 506, robot controller 508), and the operator assists it. More specifically, in this system, the operator assistance is introduced into the autonomous robot system.

Figure 6B:
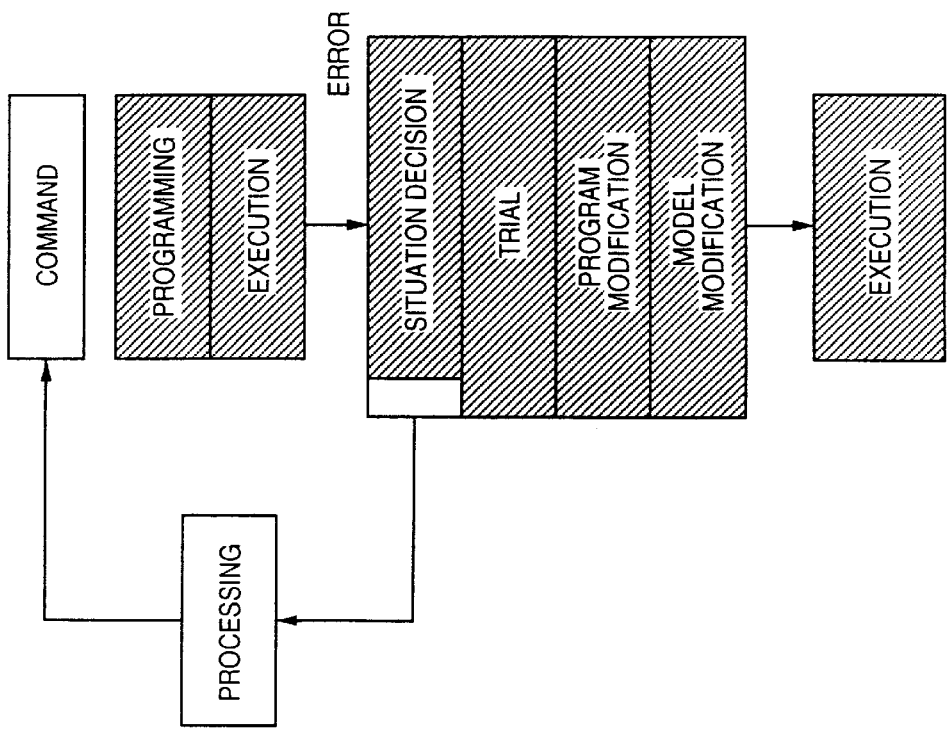
FIG. 6B is a view showing role sharing by the operator and robot in this embodiment.
Figure 6A:
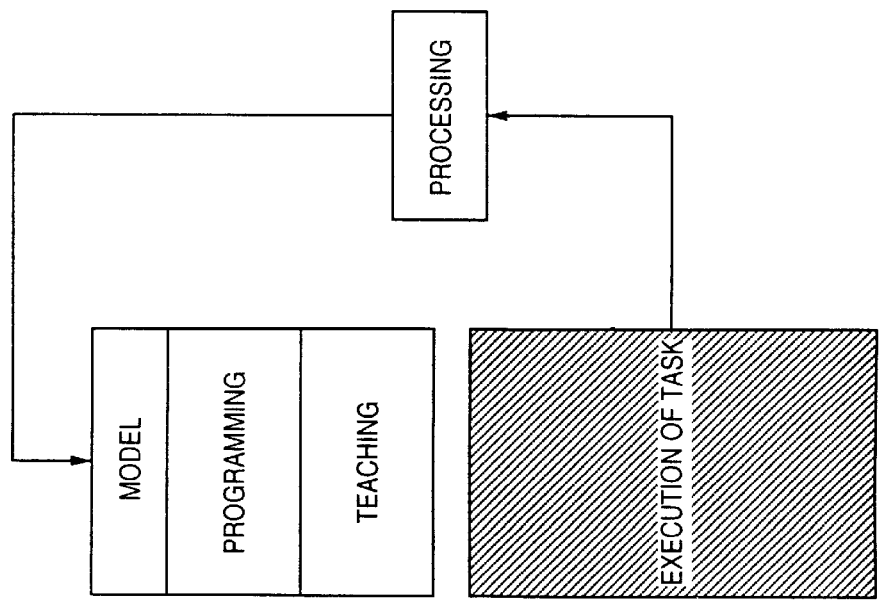
FIG. 6A is a view showing role sharing by the operator and robot in a conventional robot.

FIGS. 6A and 6B show task sharing by the operator and robot. Each open block indicates information processing by the operator, and each hatched block indicates information processing by the robot. FIG. 6A shows the sharing relationship in the conventional robot system. In this system, the operator must execute all of modeling, programming, and teaching before execution of a task, and also re-programming and re-teaching upon detecting any abnormality.

FIG. 6B shows the case of the microrobot according to the present invention. The operator can operate the microrobots by inputting a command and minimum instructions associated with circumstantial judgment.

Operation of Microrobot

Figure 7:
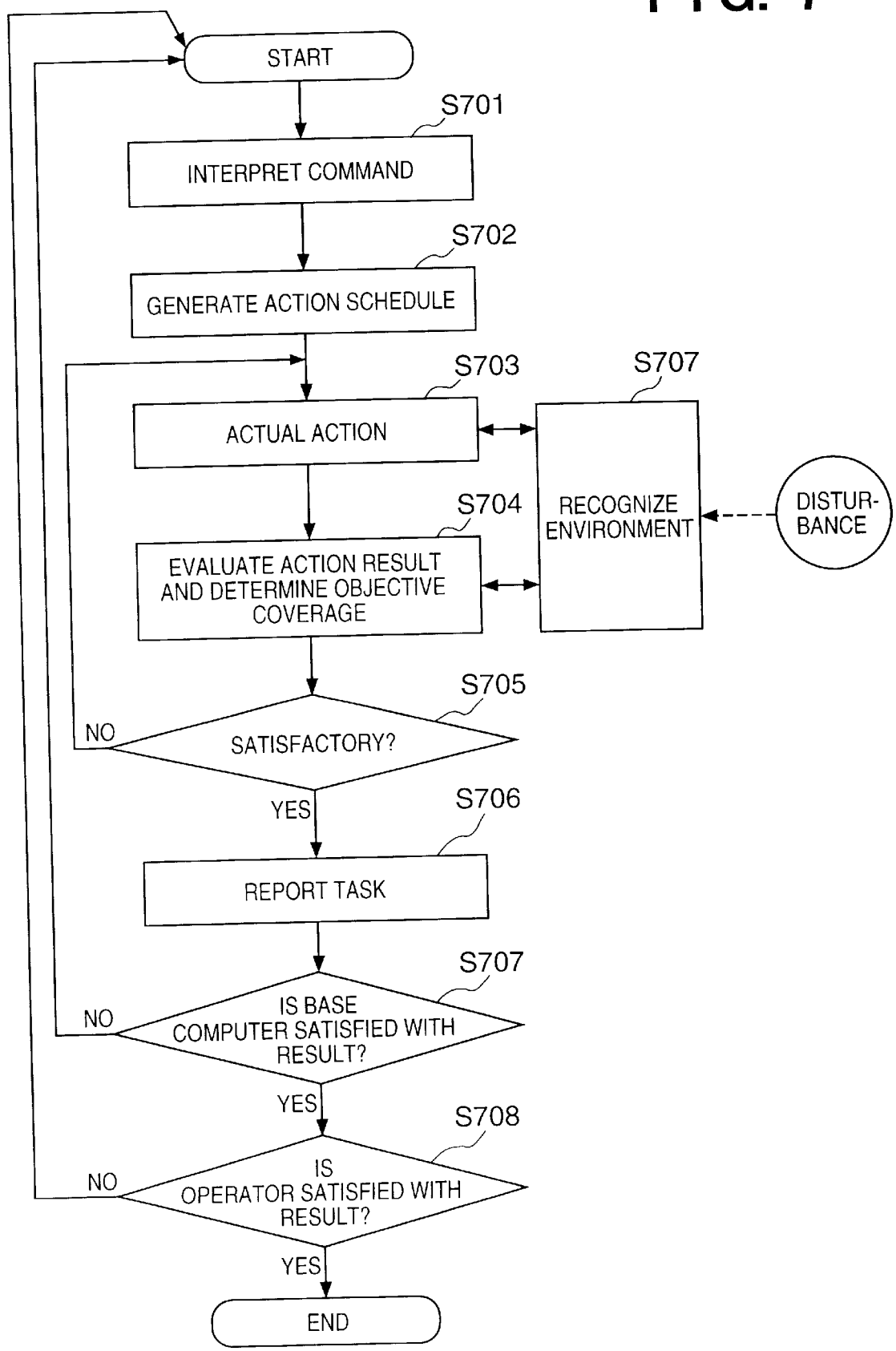
FIG. 7 is a flow chart associated with task processing of a microrobot.

The operation of each microrobot will be described below with reference to FIGS. 1, 5B, and 7. The operator 6 (FIG. 1) instructs a non-routine task of that day, e.g., fertilizer sprinkling, via a computer terminal or telephone voice (not shown) at the operator's location. The base controller 506 (FIG. 5B) in the local base 4 interprets this command (S701: FIG. 7), and sets the task of each microrobot to be a fertilizer sprinkling task. The base controller 506 (FIG. 5B) in the local base 4 generates an action schedule (S702), and the robot controller 508 drives the microrobots (1, 2, 3) in accordance with that action schedule.

The microrobots (1, 2, 3) move according to the action schedule generated by the base controller 506 (S703). In case of an agricultural microrobot like in this embodiment, weather information (e.g., temperature, humidity, weather identification, wind and rain, and the like) is a disturbance, is recognized as an environmental factor, and is fed back to the robot control as external information (S707, 507: FIG. 5B).

Weather information or the like is input as follows. That is, a weather forecast may undergo voice recognition via a wired or wireless communication line, or weather forecast information may be used via a network that uses a communication network. Also, local information may be input on the basis of weather data such as sunshine information or the like obtained from the automatic instrument shelter 11 placed in the vicinity of the local base 4.

The tasks to be executed by the microrobots (1, 2, 3) include phenomena arising from aging or sudden changes: for example, the growth of paddy, and invasion of birds and vermin. Such information is obtained using the image processing device 12. Since the position in the work space must be accurately detected in the tasks to be executed by the microrobots (1, 2, 3), the base controller 506 receives information transmitted from the microrobots (1, 2, 3), and can calculate their accurate positions using GPS measurement by the satellite 5 and the local position measuring devices 8, 9, and 10.

When the microrobots (1, 2, 3) take an action, a change in, e.g., positional relationship with the environment occurs. In order to efficiently cope with such change, each microrobot has a function of taking an action by modelling the external environment and generating a local coordinate system. Such function is controlled by the robot controller 508. The operation that has already been determined by the action schedule is manipulated by calculations of the robot controller 508 in the form of operators, thus predicting the next change in model that will take place, i.e., the next situation that will occur. The situation as a result of an actual action is compared with the predicted situation, and any difference therebetween is detected.

This difference corresponds to the error between the current value and target value, and the source of that error and whether or not the error falls within an allowable range are evaluated (S704).

Furthermore, by providing to the robot controller 508 a function of detecting and evaluating any difference between the current value and final target value and determining the current objective coverage, if the current objective coverage is not satisfactory (S705—NO), the action schedule is re-planned using environmental information obtained as a result of the action taken so far and the own state quantities (e.g., position, speed, and acceleration), so as to obtain a satisfactory coverage. The action schedule is re-planned by compensating state parameters such as a positional deviation, speed deviation, and the like by feedback, and the load on the calculation volume is relatively light. Hence, re-planning is done by the robot controller 508 in each individual microrobot.

In addition, by providing a monitor function of measuring and evaluating the time required for the planned action and energy used, when the system has reached a deadlock or fallen into a loop, emergency escape for exiting from such loop and adding a disturbance to the actual action is required. Such practical decision is made by the robot controller 508.

If it is determined based on the objective coverage that the required objective is sufficiently satisfied with the result obtained by the action taken so far (S705—YES), that result is transferred from the robot controller 508 to the base controller 506 on the base (S706). As a consequence, if the base determines that fine adjustment is required (S707—NO), it issues a command again; if the base determines completion of the task (S707—YES), it informs the operator of task completion. The operator monitors the completion state, and if he or she is not satisfied with that state (S708—NO), an instruction is issued again. If the operator approves task completion, the processing ends (S708—YES).

In the description of "Operation of Microrobot", the control for one microrobot has been mainly explained. When a plurality of microrobots (1, 2, and 3 shown in FIG. 1) are used, the base controller 506 makes distributed cooperative control for the individual microrobots.

The "distributed control" is control executed by each microrobot to execute an individual mission upon reception of an individual task command, and the "cooperative control" is control executed to remove any interference among the microrobots and to execute a mission in collaboration so as to achieve an objective common to the entire system.

Figure 8:
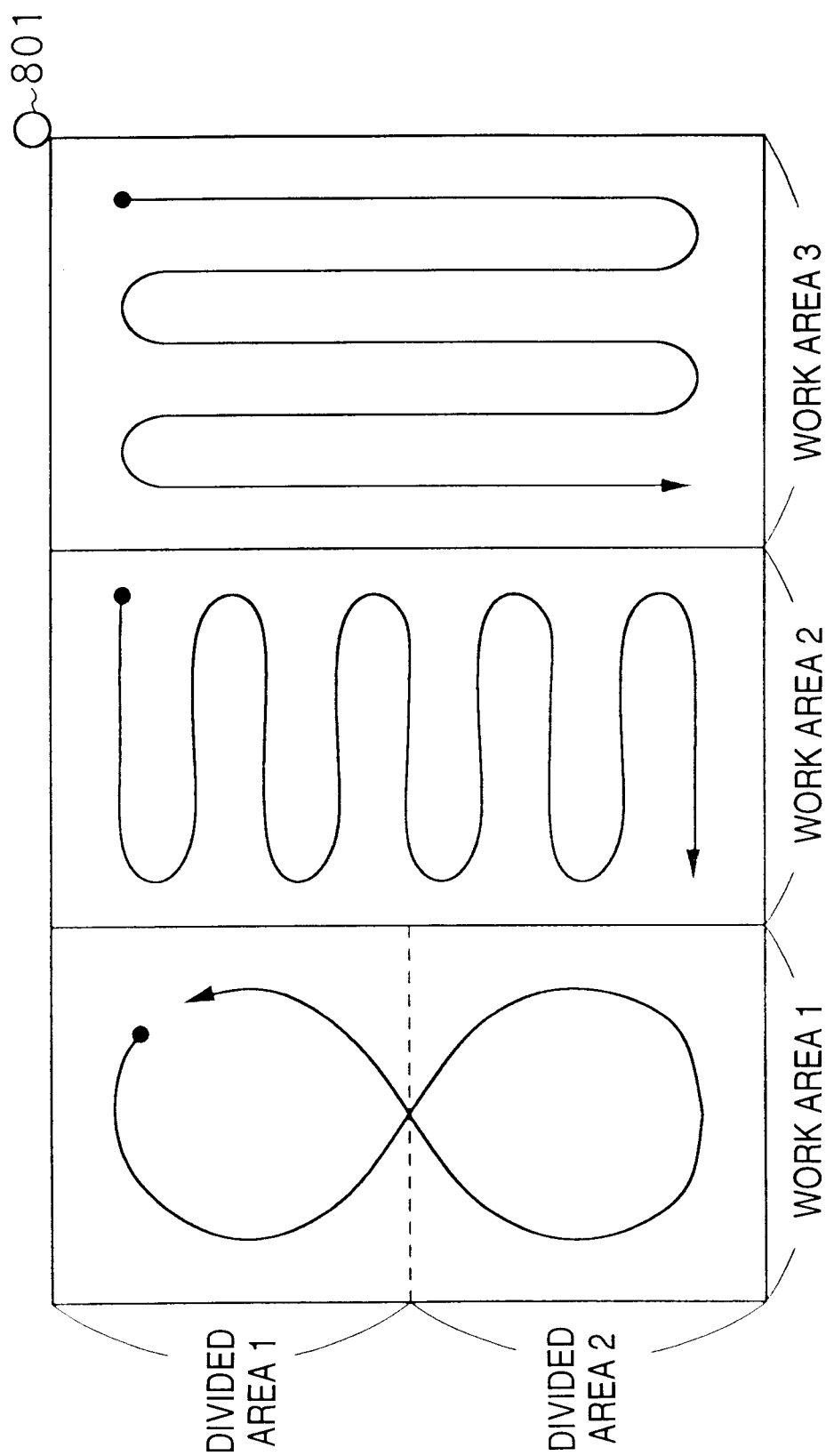
FIG. 8 is a view showing distributed cooperative operations done by robots.

FIG. 8 qualitatively shows such contents. Reference numeral 801 denotes a ground base from which three microrobots fly toward a paddy field. The paddy field is divided into three work areas, which respectively require different flight patterns resulting from different crops. When work area 1 requires an "8-shaped" flight pattern, work area 2 requires a "laterally reciprocal" flight pattern, and work area 3 requires a "longitudinally reciprocal" flight pattern, individual operations are made for the three microrobots (distributed control).

When the microrobot which covers work area 1 returns to the base 801 due to a trouble, operations for sending the microrobots which normally cover work areas 2 and 3 to work area 1 to accomplish the tasks of work area 1 are made (cooperative control).

Arrangement of Robot

Figure 9:
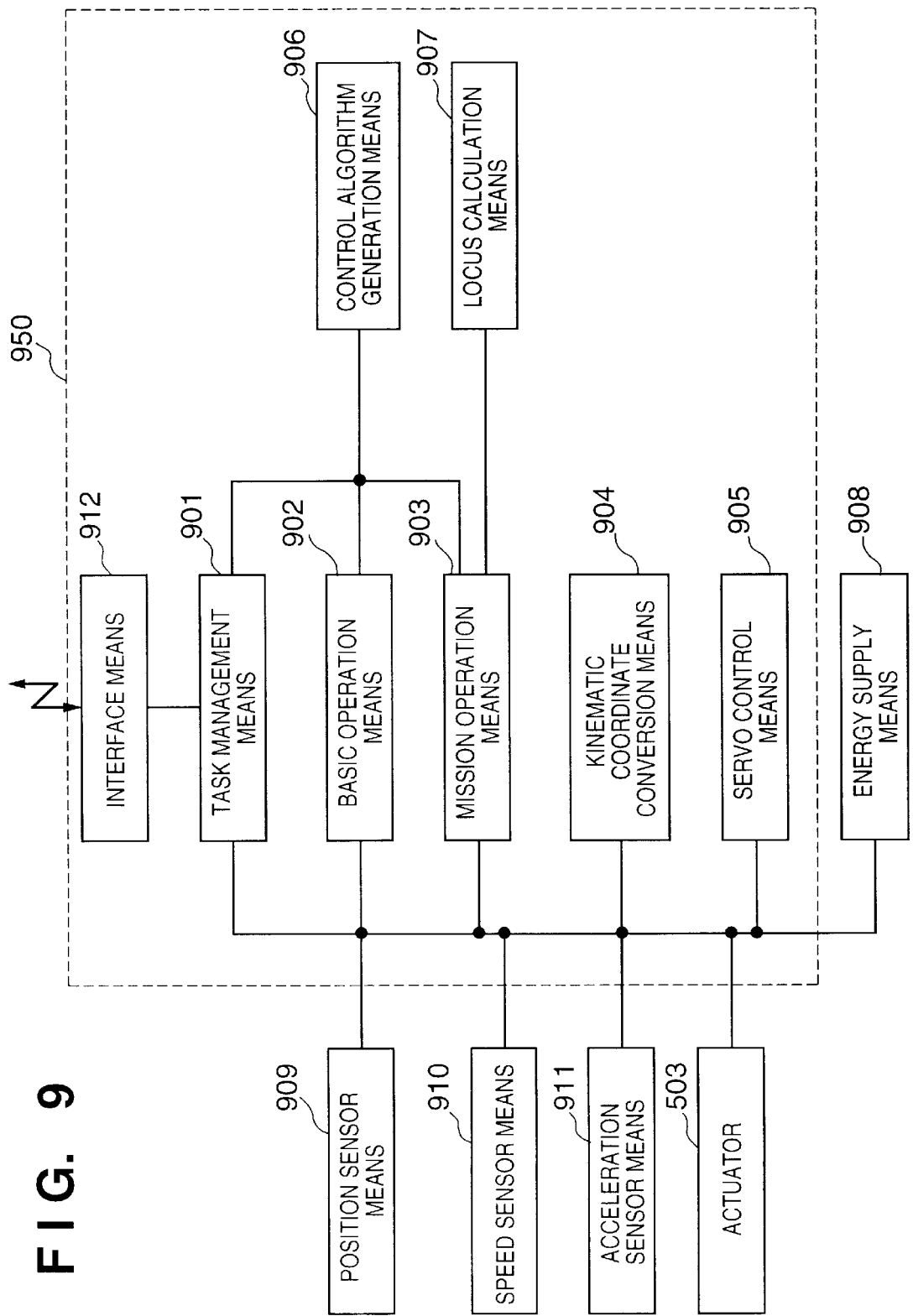
FIG. 9 is a block diagram showing the functional arrangement that pertains to the control of a microrobot.

The functional arrangement of each microrobot is divided in units of functions to achieve distributed cooperative control (FIG. 9). If the arrangement is divided to merely achieve distributed control, the communication amount upon information exchange increases too much. Hence, the arrangement is divided in units of functions to minimize the information communication amount (FIG. 9).

Figure 10:
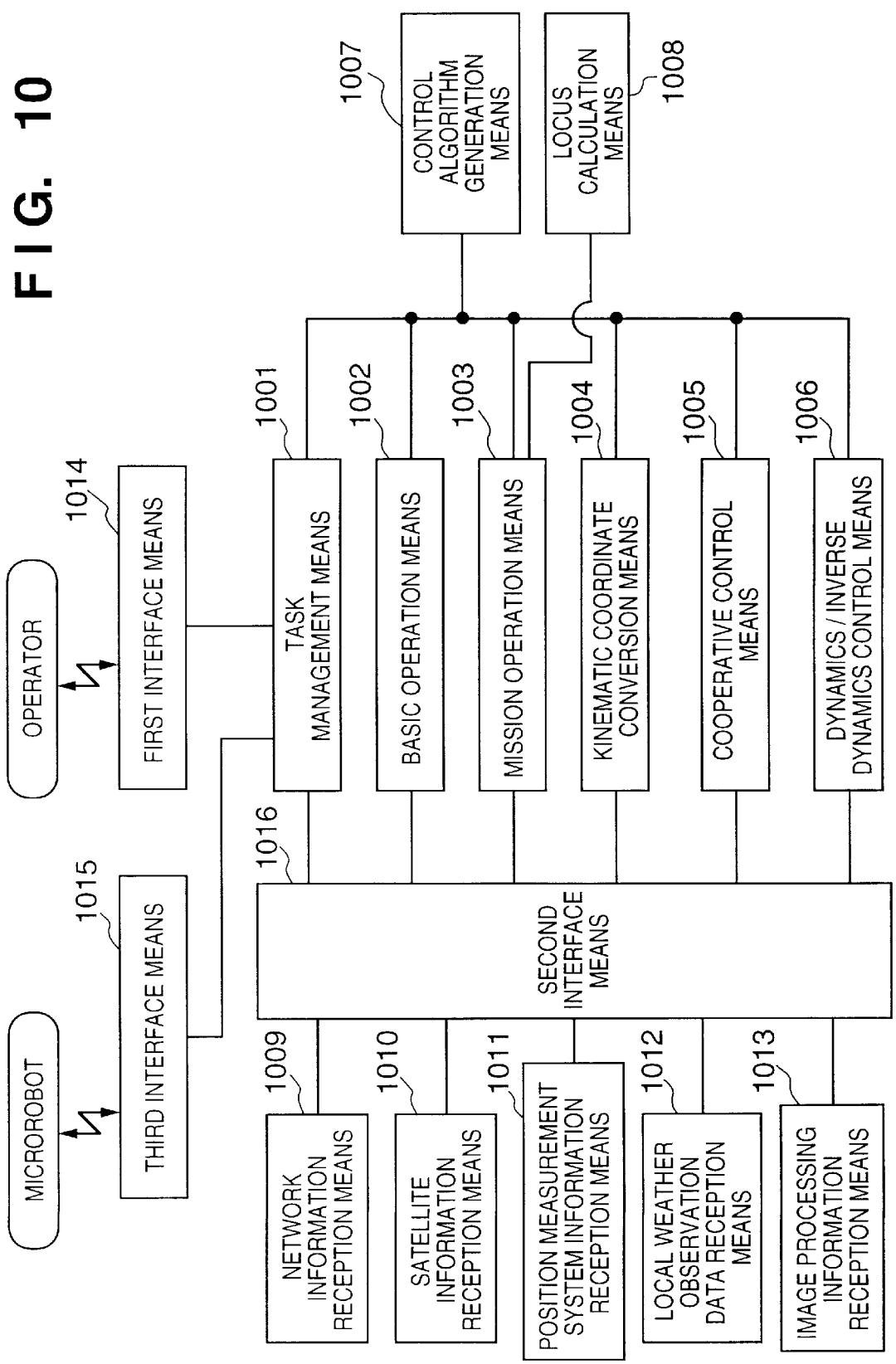
FIG. 10 is a block diagram showing the functional arrangement of a base controller.

A broken line portion 950 indicates a robot controller. In the present invention, the robot controller 950 serves as a robot controller. Command processing and communication management with the base controller 506 (FIG. 5B) are done by a "task management means 901" (second task management means). Data is exchanged with the base controller 506 (third interface means 1015: FIG. 10) via an interface means 912. A "basic operation means 902" (second basic operation means) performs basic operations such as flight and the like. A "mission operation means 903" (second mission operation means) controls mission operations such as cropdusting and the like to be executed by the microrobot. A "kinematic coordinate conversion means 904" (second kinematic coordinate conversion means) generates and converts a reference coordinate system that describes geometrical positional relationship. A "servo control means 905" controls to drive an actuator, and an "energy supply means 908" supplies energy to the microrobot. A "control algorithm generation means 906" (second control algorithm generation means) generates data for controlling the data by systematically controlling the task management means 901, basic operation mean 902, and mission operation means 903. A "locus calculation means 907" (second locus calculation means) calculates the locus of the microrobot to accomplish mission operation. Sensor information is fed back from a position sensor means 909 (acoustic position sensors and the like shown in FIG. 3), a speed sensor means 910, and an acceleration sensor means 911 (which are not shown in FIG. 3). State quantities sensed by the sensor means (909 to 911) are fed back to the robot controller as second feedback variables.

The servo control means 905 makes servo control using the action schedule command generated by the base controller as a host command value (final target value).

Arrangement of Base Controller

FIG. 10 shows the arrangement of the base controller. If the arrangement of the base controller is divided to merely achieve distributed control, the communication amount upon information exchange increases too much. Hence, the arrangement is divided in units of functions to minimize the information communication amount (FIG. 10). Processing of a command input by the operator and communication management with the robot controller 508 are done by a "task management means 1001" (first task management means). Data is exchanged with the operator via a first interface means 1014, and is also exchanged with each microrobot via a third interface means 1015. A "basic operation means 1002" (first basic operation means) controls basic operations such as flight and the like of each microrobot. A "mission operation means 1003" (first mission operation means) controls missions such as cropdusting and the like to be assigned to the microrobot. A "kinematic coordinate conversion means 1004" (first kinematic coordinate conversion means) generates and converts a reference coordinate system that describes the geometrical positional relationship between the base controller 506 and microrobots (1, 2, 3). A "cooperative control means 1005" independently and cooperatively controls a plurality of microrobots (1, 2, 3). A "dynamics inverse dynamics control means 1006" generates a torque command upon executing force control under a predetermined configuration. A "control algorithm generation means 1007" (first control algorithm generation means) generates control data in accordance with information such as aging or sudden change in external information obtained by external information reception means (1009 to 1013; to be described later), weather information, position information, and the like, a target value input by the operator, and information fed back from the robot controller 950.

The control algorithm generation means 1007 generates an action schedule command value from a control algorithm that controls each microrobot by systematically controlling the task management means 1001, basic operation means 1002, mission operation means 1003, kinematic coordinate conversion means 1004, cooperative control means 1005, and dynamics-inverse dynamics control means 1006. The generated action schedule command value is transmitted to each microrobot via the task management means 1001 and third interface means 1015.

In the present invention, the base controller (FIG. 10, FIG. 5B (506)) serves as a base controller. Information received by the external information reception means (1009 to 1013) via the second interface means, and information fed back from the microrobots (1, 2, 3) and received by the third interface means are fed back to the base controller as first state feedback variables.

A locus calculation means 1008 calculates locus in the overall work space required for controlling the microrobots.

A network information reception means 1009 receives information via a telephone line, radio line, or network line. A satellite information reception means 1010 receives information transmitted by satellite broadcast, satellite communications, a weather satellite, or a GPS satellite. A position measurement system information reception means 1011 receives information from a position measurement system. Furthermore, a local weather observation data reception means 1012 receives local information such as local temperature, humidity, and the like in the vicinity of the microrobot work space. An image processing information reception means 1013 receives monitor information from an image processing means located in the vicinity of the microrobot work space. Information sent from each of these information reception means (1009 to 1013) is received by the second interface means.

Measurement of Microrobot Local Position

Figure 2:
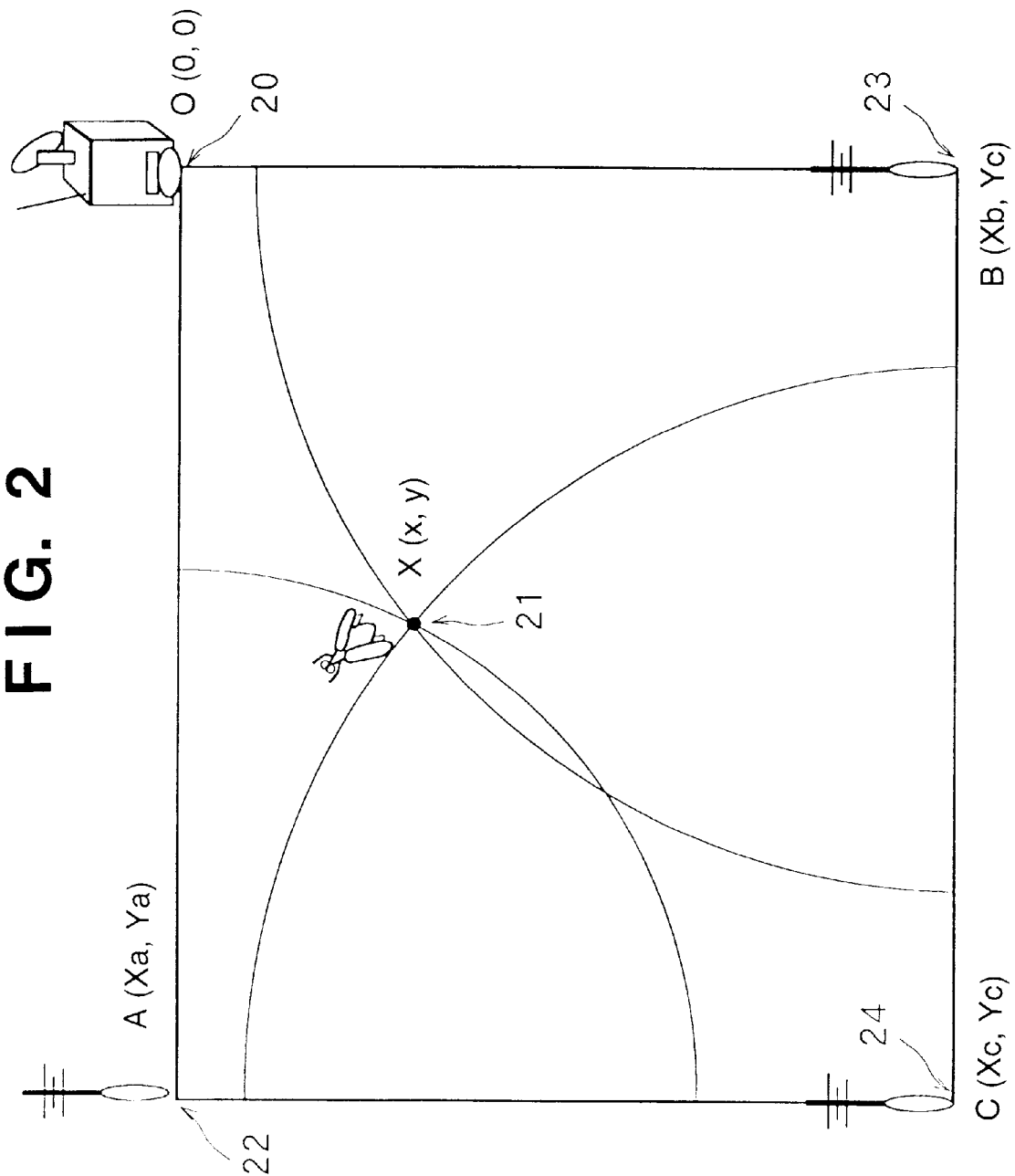
FIG. 2 is a view for explaining detection of position information of a microrobot.

FIG. 2 shows an example of the local position measurement device. Referring to FIG. 2, reference numeral 20 denotes the position of the local base 4, which position serves as an origin; 21, a microrobot position to be measured; 22, an underwater acoustic oscillator 1 placed at one corner of the paddy field; 23, an underwater acoustic oscillator 2 placed at another corner of the paddy field; and 24, an underwater acoustic oscillator 3 placed at still another corner of the paddy field.

An example of the method of measuring the position 21 using these three oscillators will be explained below. Assume that O(0, 0) represents the coordinate position 20 of the local base, which is used as an origin, X(x, y) represents the position of the microrobot, A(Xa, Ya) represents the position of the oscillator 22, B(Xb, Yb) represents the position of the oscillator 23, and C(Xc, Yc) represents the position of the oscillator 24. Also, f1, f2, and f3 respectively represent the acoustic oscillation frequencies of these oscillators.

An instruction from the local base 4 is transmitted to the oscillators 22, 23, and 24, and the microrobot at the position 21 using wired or wireless sync signals, and the oscillators 22, 23, and 24 oscillate underwater acoustic signals of different frequencies at time $t_0$.

If these underwater acoustic signals have equal acoustic speeds v, we have:

$$(x-Xa)^2+(y-Ya)^2=(v(ta-t_0))^2 \quad (1)$$

$$(x-Xb)^2+(y-Yb)^2=(v(tb-t_0))^2 \quad (2)$$

$$(x-Xc)^2+(y-Yc)^2=(v(tc-t_0))^2 \quad (3)$$

where ta, tb, and tc are respectively the arrival times of the oscillation signals from the positions A, B, and C. The microrobot at the position 21 measures the three arrival times, and can calculate its own coordinate position (x, y) by solving the three simultaneous equations.

Note that the oscillators 22, 23, and 24 maybe replaced by receivers, and the microrobot at the position 21 may serve as an oscillator to attain the same measurement as described above. Hence, the local base as a ground station can detect the position 21 of the microrobot.

Also, the same measurement may be attained using surface vibrations, electromagnetic waves, and the like such as a sonic wave, ultrasonic wave, seismic wave, and the like.

Furthermore, the number of oscillators is not limited to three, and four or more oscillators may be used. In such case, if oscillation time $t_0$ is unknown, the solution can be inferred by forming simultaneous equations like equations (1) to (3) above on the basis of known time information. When the number of oscillators is increased, position calculation precision can be improved, and the dead zone of measurement can be reduced.

Effect of Embodiment

The base controller 506 in the local base 4 receives environmental conditions (temperature, humidity, invaders, and the like) on the basis of the command value from the operator, and generates an action schedule of microrobots. When a plurality of microrobots are to be controlled, distributed and cooperative control rules can be generated as the action schedule, and state quantities required for autonomously determining the action is transmitted to each microrobot. Since each microrobot is controlled by a processing system which is divided in units of functional arrangements, the amount of calculations done by the microrobot upon executing a task can be minimized. The concept of robot control based on such functional arrangements is derived from analogy to living bodies, and fault-tolerant microrobots can be provided. Also, a secondary effect may be expected. That is, even though some functions fail due to a certain damage, a fatal state, e.g., sudden death can be avoided.

Furthermore, each microrobot makes feedback control making its autonomous judgement aimed at task completion, and executes a given mission. The base controller receives environmental data and disturbance condition data from a plurality of external information reception means, generates a control rule for a task input by the operator by integrating various kinds of information, and sends an instruction to each microrobot. Hence, the microrobot itself needs neither a high-level communication function nor processing performance.

The microrobot can obtain its coordinate position with respect to the local base by only receiving position information so as to detect its position information. Since the local base solves simultaneous equations and the microrobot receives that solution, the microrobot can obtain its coordinate position data without calculating each time a need arises.

When the operator inputs a macro control command, each microrobot takes an actual action based on the command. That action is autonomously controlled to successfully execute the macro command. The autonomous control is to feed back and control any deviation between sensor information (position, speed, and acceleration) of the microrobot and the control command. When a plurality of microrobots are used and must take distributed, cooperative actions, conditions required for task completion such as environmental conditions (temperature, humidity, and the like) are obtained via communications with the base controller and are used for compensating control information for any contingency. Such control allows each microrobot to cope with complicated tasks independently of the number of sensors, communication performance, and computer processing performance.

Another Embodiment

The objects of the present invention are also achieved by supplying a recording medium, which records a program code of a software program that can realize the functions of the above-mentioned embodiments to the system or apparatus, and reading out and executing the program code stored in the recording medium by a computer (or a CPU or MPU) of the system or apparatus.

In this case, the program code itself read out from the recording medium realizes the functions of the above-mentioned embodiments, and the recording medium which stores the program code constitutes the present invention.

As the recording medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Figure 11:
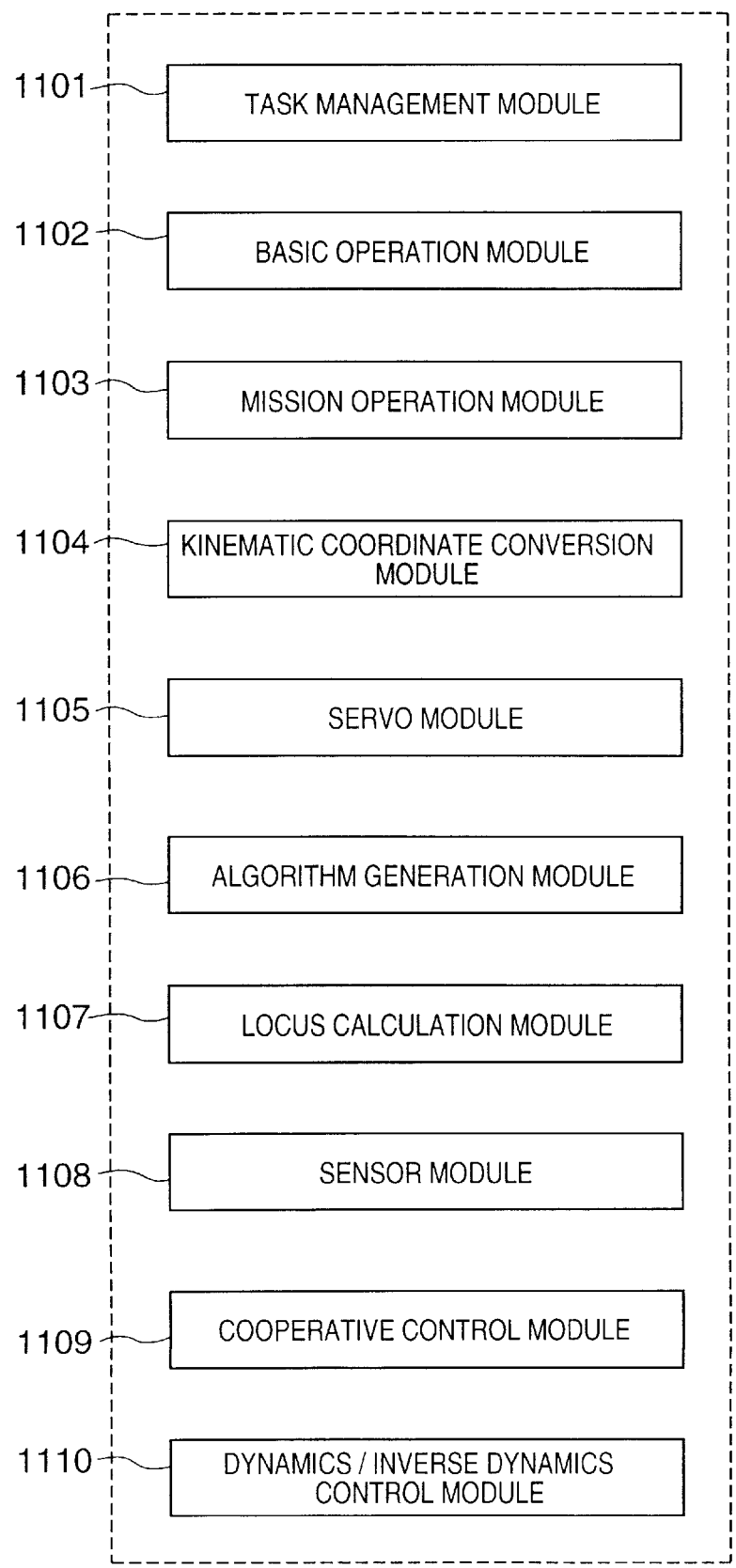
FIG. 11 shows a memory map of a recording medium in this embodiment.

Furthermore, the functions of the above-mentioned embodiments may be realized by some or all of actual processing operations executed by a CPU or the like arranged in a function extension board or a function extension unit, which is inserted in or connected to the computer, after the program code read out from the recording medium is written in a memory of the extension board or unit. When the present invention is applied to the recording medium, the recording medium stores program codes corresponding to the above-mentioned flow chart. That is, modules shown in the memory map in FIG. 11 are stored in the recording medium.

More specifically, the recording medium can only store program codes of at least a "task management module 1110", "basic operation module 1120", "mission operation module 1130", "kinematic coordinate conversion module 1140", "servo module 1150", "algorithm generation module 1160", "locus calculation module 1170", and "sensor module 1180".

The base controller receives environmental conditions (temperature, humidity, invaders, and the like) on the basis of the command value from the operator, and generates an action schedule of microrobots. In the microrobot system, when various kinds of external information and sensor information are used in a control rule, an action schedule required for a non-routine task can be generated.

When a plurality of microrobots are to be controlled, the action schedule can be independently controlled. The robot controller outputs a drive command to each microrobot on the basis of this action schedule. The drive command is a control command required for driving each microrobot, and the communication amount of data to be sent to each microrobot and the amount of calculations done by the microrobot upon executing a task are minimized as compared to the action schedule. Such control allows each microrobot to cope with complicated tasks independently of the number of sensors, communication performance, and computer processing performance.

The present invention is not limited to the above embodiments and various changes and modifications can be made within the spirit and scope of the present invention. Therefore, to appraise the public of the scope of the present invention, the following claims are made.

What is claimed is:

1. A robot system for controlling a robot on the basis of an instruction from an operator, comprising:

first reception means for receiving the instruction from the operator;

second reception means for receiving external information;

third reception means for receiving a state quantity of the robot;

base controller for generating an action schedule command for the robot using data received by said first reception means as a target value and data received by said second and third reception means as first state feedback variables;

robot controller for generating a drive command for driving the robot on the basis of the action schedule command generated by said base controller;

sensing means for sensing the state quantity of the robot; and determination means for determining a coverage of the action schedule command by comparing the state quantity sensed by said sensing means and the drive command value directed by said robot controller;

wherein command values of said base controller and said robot controller are distributed and controlled in accordance with a determination result of said determination means.

2. The system according to claim 1, wherein said base controller can independently control a plurality of robots.

3. The system according to claim 1, wherein said robot controller controls to drive the robot using the action schedule command generated by said base controller as a target value, and the state quantity sensed by said sensing means as a second state feedback variable.

4. The system according to claim 1, wherein said second reception means can receive information transmitted by satellite broadcast, a satellite communication, a weather satellite, or a GPS satellite.

5. The system according to claim 1, wherein said second reception means can receive information via a telephone line, radio line, or network line.

6. The system according to claim 1, wherein said second reception means can receive information from a position measurement system.

7. The system according to claim 1, wherein said second reception means can receive weather information from weather observation means placed in the vicinity of an activity range of the robot.

8. The system according to claim 1, wherein said second reception means can receive monitor information from image processing means placed in the vicinity of an activity range of the robot.

9. The system according to claim 1, wherein said base controller comprises:

first receiving means for receiving the instruction from the operator;

second receiving means for receiving external information;

third receiving means for receiving a state quantity of the robot;

first control algorithm generation means for generating a command for the robot using data received by said first receiving means as a target value, and data received by said second and third receiving means as first state feedback variables;

first basic operation means for controlling execution of basic operation on the basis of the generated command;

first mission operation means for controlling mission operation of the instruction from the operator;

dynamics control means for servo-controlling the basic and mission operations of the robot; and first task management means for managing mission of the instruction from the operator.

10. The system according to claim 9, wherein said base controller further comprises first kinematic coordinate conversion means capable of calculating position information of the robot on the basis of geometric coordinate conversion.

11. The system according to claim 9, wherein said base controller further comprises first locus calculation means for calculating a specific locus when the robot executes the instruction mission operation along the specific locus.

12. The system according to claim 9, wherein said base controller comprises cooperative control means for, when a plurality of robots are to be controlled, cooperatively controlling the robots.

13. The system according to claim 1, wherein said robot controller comprises:

interface means for exchanging data with said base controller;

second task management means for managing mission of an instruction from said base controller;

second control algorithm generation means for generating control data for mission of the instruction on the basis of information from said task management means;

second basic operation means for performing basic operation on the basis of the generated control data;

second mission operation means for executing the instruction mission operation; and servo control means for servo-controlling the basic and mission operations.

14. The system according to claim 13, wherein said robot controller further comprises second kinematic coordinate conversion means capable of calculating position information of itself on the basis of geometric coordinate conversion.

15. The system according to claim 13, wherein said robot controller further comprises second locus calculation means for calculating a specific locus when the instruction mission operation is executed along the specific locus.

16. A method of controlling a robot system for controlling a robot on the basis of an instruction from an operator, comprising:

the first reception step of receiving the instruction from the operator;

the second reception step of receiving external information;

the third reception step of receiving a state quantity of the robot;

the first control step of generating an action schedule command for the robot using data received by in the first reception step as a target value and data received in the second and third reception steps as first state feedback variables;

the second control step of generating a drive command for driving the robot on the basis of the action schedule command generated in the first control step;

the sensing step of sensing the state quantity of the robot; and the determination step of determining a coverage of the action schedule command by comparing the state quantity sensed in the sensing step and the drive command value directed in the second control step, wherein command values of the first and second control steps are distributed and controlled in accordance with a determination result in the determination step.

17. The method according to claim 16, wherein the first control step can independently control a plurality of robots.

18. The method according to claim 16, wherein the second control step controls to drive the robot using the action schedule command generated in the first control step as a target value, and the state quantity sensed in the sensing step as a second state feedback variable.

19. The method according to claim 16, wherein the second reception step can receive information transmitted by satellite broadcast, a satellite communication, a weather satellite, or a GPS satellite.

20. The method according to claim 16, wherein the second reception step can receive information via a telephone line, radio line, or network line.

21. The method according to claim 16, wherein the second reception step can receive information from a position measurement system.

22. The method according to claim 16, wherein the second reception step can receive weather information from weather observation means placed in the vicinity of an activity range of the robot.

23. The method according to claim 16, wherein the second reception step can receive monitor information from image processing means placed in the vicinity of an activity range of the robot.

24. A computer-readable recording medium comprising a program that makes a computer implement:

first reception means for receiving the instruction from the operator;

second reception means for receiving external information;

third reception means for receiving a state quantity of the robot;

base controller for generating an action schedule command for the robot using data received by said first reception means as a target value and data received by said second and third reception means as first state feedback variables;

robot controller for generating a drive command for driving the robot on the basis of the action schedule command generated by said base controller;

sensing means for sensing the state quantity of the robot; and determination means for determining a coverage of the action schedule command by comparing the state quantity sensed by said sensing means and the drive command value directed by said robot controller, wherein said program makes the computer distribute and control command values of said base controller and said robot controller in accordance with a determination result of said determination means.

* * * * *